Patented Oct. 31, 1922.

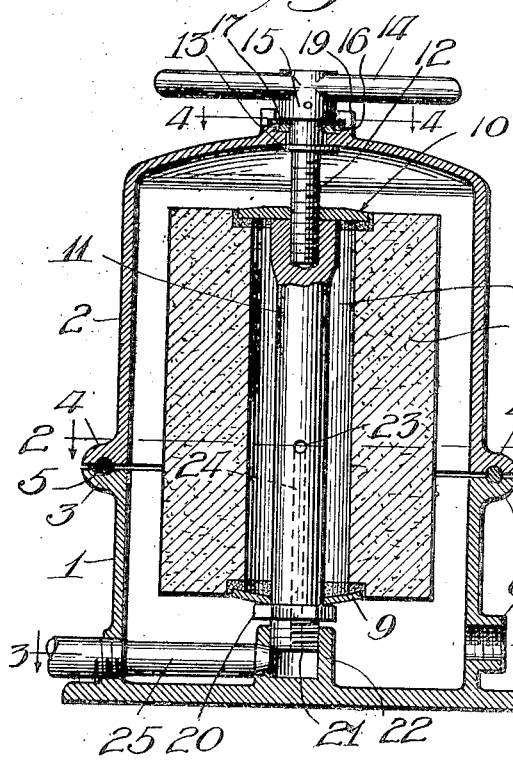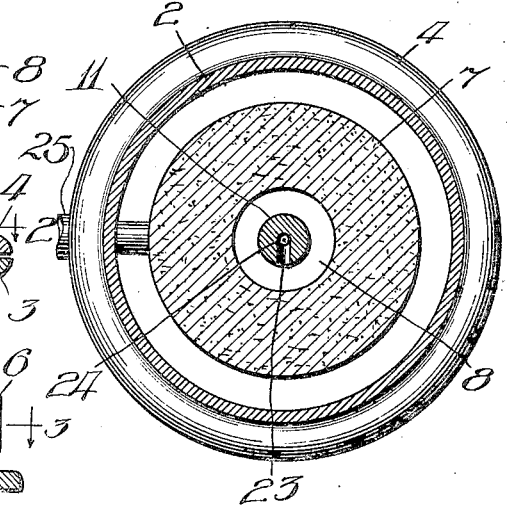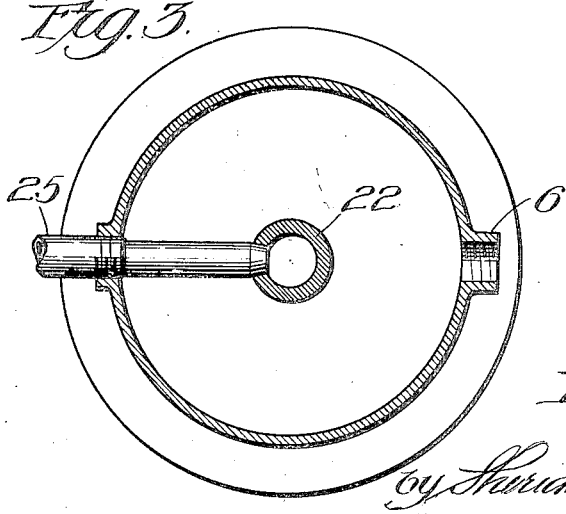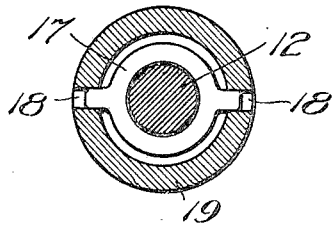

1,433,714

UNITED STATES PATENT OFFICE.

HENRY GIESSEL, OF CHICAGO, ILLINOIS.

WATER FILTER.

Application filed July 11, 1921. Serial No. 483,645.

*To all whom it may concern:*

Be it known that I, HENRY GIESSEL, a citizen of the United States, residing at Chicago, in the county of Cook and State of Illinois, have invented certain new and useful Improvements in Water Filters, of which the following is a specification.

My invention relates to improvements in water filters. It is particularly adapted for use with water filters and coolers such as are used on railway passenger cars, although it is not necessarily limited to such use.

One object of the invention is to provide an improved construction whereby the filter casing may be more readily removed and the filter stone more conveniently replaced than heretofore. Another object is to provide a generally improved construction.

In the accompanying drawings I have illustrated one embodiment of the invention, in which—

Figure 1 is a vertical sectional elevation of the device;

Fig. 2 is a section taken on the line 2—2 of Fig. 1;

Fig. 3 is a section taken on the line 3—3 of Fig. 1; and

Fig. 4 is a section taken on the line 4—4 of Fig. 1.

The structure illustrated comprises a container consisting of two separable parts 1 and 2, having flanges 3 and 4 containing grooves which receive a suitable gasket 5, to render the container water-tight when the upper and lower parts are held together. The water to be filtered enters through an inlet 6 and surrounds the filter stone 7, the latter having a hollow cylindrical center 8, in which the filtered water collects after seeping through the stone. Metal disks or washers 9, 10 are cemented into recesses at each end of the cylindrical stone filter.

A rod 11, made preferably of brass, is located within the hollow center of the filter stone, and is held in place by a screw-threaded extension 12, which passes through an opening in the disk 10 and engages the upper part of the rod. Said screw-threaded extension or stem 12 is provided with a flange 13 and passes upwardly through an opening in the upper part of the container 2, being provided with a handle 14 and a collar 15 at its upper end.

To prevent leakage of water, I provide a rubber gasket 16, above which I place a metal washer 17 having side extensions which are received within notches 18 within the circular flange 19. The metal washer is thereby prevented from rotating and exerts a downward pressure on the rubber washer without tending to rotate it. Sliding contact is provided between the metal washer 17 and the collar 15, thereby preventing tearing of the washer when the handle is turned in a direction to force the stem 12 downwardly. A slight clearance is preferably provided between the metal washer and said stem, the rubber being squeezed into this space to some extent, thereby preventing leakage of water.

The lower end of the rod 11 passes through an opening in the lower washer 9 and carries a nut 20, which serves to clamp the filter stone in position on the rod. The lower screw-threaded extremity 21 engages a screw-threaded central boss 22, formed integrally with the base 1. A radial opening 23 in the rod communicates with a longitudinal opening 24 in the lower part thereof, which communicates with the chamber in the boss, an outlet pipe 25 leading from said chamber and passing through the casing, thereby permitting the filtered water to flow from the hollow central chamber within the stone filter through said hollow outlet pipe to the water cooler or elsewhere.

With the present construction, to remove the filter stone it is necessary merely to turn the handle 14 in a direction to unscrew the threaded stem 12 from the rod 11, this action serving to force the upper half of the container 2 from the lower half 1, regardless of any tendency of the flanges 3 and 4 to stick to the rubber gasket 5. When the stem is completely disengaged from the rod, the upper part of the container is lifted off, leaving the filter stone projecting well above the lower part of the container 1, whereby it may be readily grasped by the operator and rotated, thereby unscrewing the lower end 21 from the boss 22 and permitting the quick substitution of a clean filter stone.

Stone filters require frequent renewal in order that the stone may be cleaned and rendered sanitary, a clean stone being substituted for the one removed, in order that no time may be lost by the cleaning operation. Filters of the character described are usually located in an alcove in the railway car, as a result of which there is little head room or clearance above the same, so that it has been both difficult and inconvenient to renew the filter stone. Furthermore, the two parts of the container have been separated along a horizontal plane near the top thereof, the parts being fastened together by clamping bolts. After removing these bolts the rubber between the flanges would frequently stick to said flanges, thereby making it necessary to pry the upper flange away from the lower, after which the upper part of the container, which was practically a cover, could be lifted off, but the operator would find that access to the filter stone was difficult. With the construction described herein access to said stone is readily had and quick renewal facilitated.

Certain of the mechanical features described herein are not limited to use as a part of a filter, but may be employed in other apparatus.

I claim:—

1. In a device of the class described, a container comprising separable parts, a filter stone carried by one of said parts, and means carried by the other of said parts also engaging said filter stone for forcing one part of said container parts away from the other.

2. In a device of the class described, a container comprising upper and lower separable parts divided on a horizontal plane, a filter stone structure mounted on said lower part, a screw-threaded member carried by said upper part and engaging said filter stone structure, and means for rotating said screw-threaded member to lift said upper part from said lower part.

3. A filter structure comprising a separable container having a water inlet and outlet, a hollow filter stone having its hollow portion closed at the ends, means extending from one of said closures for engaging the lower part of said container, means extending from the upper closure for engaging the upper part of said container, and means causing a relative movement of one part of said container with reference to said filter stone to aid in separating the parts of said container.

4. A filter structure, comprising a base, a removable cover therefor, a gasket between said base and cover, a filter stone having screw-threaded engagement with said base, and a member carried by said cover and engaging said filter stone to facilitate the removal of said cover, said filter stone projecting above said base to permit ready removal thereof.

5. A filter structure comprising a container having a plurality of separable parts, a filter stone within the same, a screw-threaded rod passing through one of said parts and engaging said filter stone, a compressible washer surrounding said rod, a metal washer adjacent thereto, and means for preventing rotation of said metal washer.

6. In combination, a container, a hollow filter stone therein having means cemented thereto to close the ends thereof, means for securing said filter stone to the bottom of said container, and means for securing the top of said container to said filter stone.

In testimony whereof, I have subscribed my name.

HENRY GIESSEL.